F. W. LATHAM.
PIPE STOPPER.
APPLICATION FILED SEPT. 2, 1915.
1,377,840. Patented May 10, 1921.
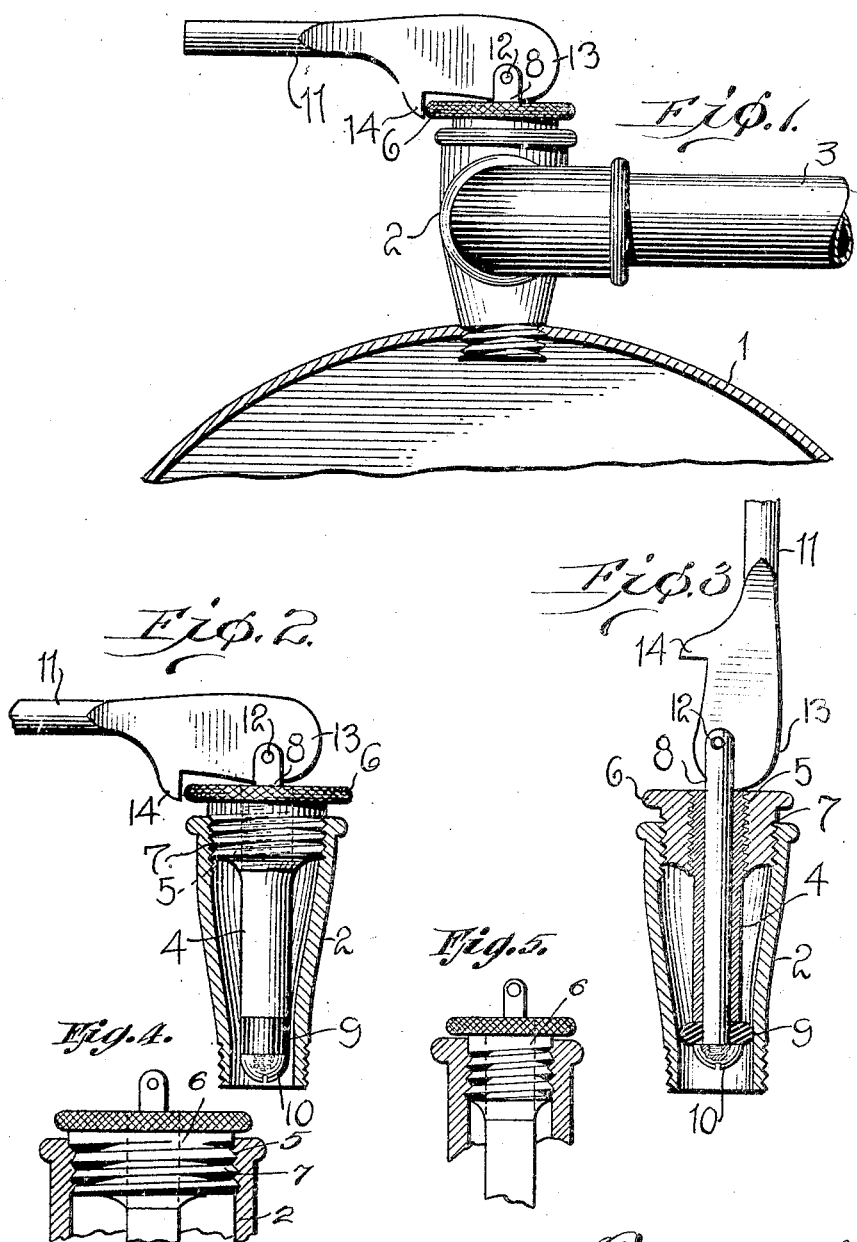

UNITED STATES PATENT OFFICE.

FRANK W. LATHAM, OF ALEXANDRIA, VIRGINIA.

PIPE-STOPPER.

1,377,840.  Specification of Letters Patent.  Patented May 10, 1921.

Application filed September 2, 1915. Serial No. 48,603.

*To all whom it may concern:*

Be it known that I, FRANK W. LATHAM, a citizen of the United States, residing at Alexandria, in the county of Alexandria and State of Virginia, have invented certain new and useful Improvements in Pipe-Stoppers, of which the following is a specification.

My invention relates to pipe stopper or plugs, and is particularly applicable to gas mains and pipes.

The object of my invention is to provide a plug which may be threaded into the gas main so that the gas may be shut off from the house service pipes.

Furthermore, the object of my invention is to provide a gas or water main or pipe plug which may be threaded into a gas or water main and be expanded through the medium of a lever to shut off the gas or water from the main so that repairs can be made on the house service pipes.

Finally, the object of my invention is to provide an adjustable, expansible plug which may be threaded into a main to cut off the gas or water while making surface connections or repairs to the house service pipes.

With the above and other objects in view my invention consists in the details of construction and in the arrangement and combination of the several parts, more particularly set forth in the specification and claim, and illustrated in the accompanying drawing, forming a part of this application, and in which:

Figure 1 is a perspective view of my invention threaded in a gas main.

Fig. 2 is a sectional view showing the plug inserted in the pipe connection, with the washer in a contracted position.

Fig. 3 is a vertical sectional view illustrating the stopper in an expanded position, and Figs. 4 and 5 designate different size thumb nuts employed with the device.

In the drawing like reference characters denote corresponding parts in the several views, and in which 1 indicates a street gas or water main, and 2 a T-connection which is connected at one end to the main, and to the house service pipe, 3, at the opposite end. The parts 1 and 2, it is to be understood, are of standard shape but are of varying standard size, in accordance with the present day manufacture of such devices. A cylindrical tube, 4, is provided at its upper end with screw threads, 5, upon which a thumb nut, 6, is threaded. Thumb nuts of different sizes are provided to accommodate themselves to the varying sizes of T-connections 2 which are manufactured. Each of the thumb nuts 6 is provided with screw threads, 7, on its outer surface, which are adapted to be threaded into the top end of the T-connection, 2. A rod, 8, extends through the tube, 4, and surrounding the rod, 8, at its lower end I provide a rubber washer, 9. Threaded on the lower end of the rod, 8, is a nut, 10, which prevents the rubber washer, 9, from becoming accidentally displaced from the rod, the washer being held between the lower end of the tube, 4, and nut, 10. A lever, 11, is pivotedly connected to the upper end of the rod, 8, by a pin, 12. The lever, 11, is provided with a cam surface, 13, upon one side and a projection, 14, on the opposite side.

In the use of my device the thumb nut, 6, is threaded into the top of the T-connection on the surface main, and by operating the lever from the position shown in Fig. 2 to that shown in Fig. 3, the rod, 8, is drawn outward through the tube, 4, and the nut, 10, on the lower end of the rod, thereby compressing and expanding the rubber washer. The position of the rubber washer before expanding is illustrated in Fig. 2. When the rubber washer is expanded so that it is forced against the inner surface of the pipe, the gas is shut off from the service pipe, when such repairs as may be necessary may be made to the pipe without any danger of escaping gas.

It is believed that the construction and operation of my device will be fully understood from the foregoing description, it being noted that various changes may be made in the construction and detail of arrangements without departing from the scope of my invention.

Having fully described my invention what I claim as new and desire to secure by Letters Patent is:

In a pipe stopper of the class described, a series of thumb nuts of different sizes, each provided with a screw threaded opening through the center thereof, a tube provided at its upper end with a screw threaded portion and adapted to be retained by the screw threaded portion of the thumb nut, a rod provided with screw threads at its lower end extending through said tube, a cam shaped lever pivoted at the upper end of said rod, a cap nut threaded on the lower end of said rod, a rubber gasket positioned on said rod between the end of said tube and cap nut and adapted to be laterally expanded by the movement of said cam shaped lever, as and for the purpose set forth.

In testimony whereof I affix my signature in presence of two witnesses.

FRANK W. LATHAM.

Witnesses:
JNO. B. WALLER,
FRED W. EBHARDT.